United States Patent [19]

Dellacorte

[11] Patent Number: 6,007,068
[45] Date of Patent: Dec. 28, 1999

[54] DYNAMIC FACE SEAL ARRANGEMENT

[75] Inventor: Christopher Dellacorte, Medina, Ohio

[73] Assignee: US Government as represented by the Administrator of NASA Headquarters, Washington, D.C.

[21] Appl. No.: 08/753,346

[22] Filed: Nov. 25, 1996

[51] Int. Cl.⁶ .................................................. F16J 15/34
[52] U.S. Cl. ........................... 277/82; 277/81 R; 277/85; 277/96.2
[58] Field of Search ................................. 277/81 R, 82, 277/85, 88, 91, 96.2

[56] References Cited

U.S. PATENT DOCUMENTS

| | | | |
|---|---|---|---|
| 1,964,063 | 6/1934 | Kagi | 277/88 |
| 1,983,855 | 12/1934 | Jenkins | 277/88 |
| 1,998,790 | 9/1935 | Potter | 277/88 |
| 2,595,926 | 5/1952 | Chambers, Jr. | 277/91 |
| 2,708,124 | 5/1955 | Robb | 277/82 |
| 3,356,378 | 12/1967 | Tracy | 277/88 |
| 3,554,559 | 1/1971 | Dahlheimer . | |
| 3,751,046 | 8/1973 | Goluber et al. | 277/88 |
| 4,094,514 | 6/1978 | Johnson . | |
| 4,103,904 | 8/1978 | Tankus . | |
| 4,323,255 | 4/1982 | Wiese . | |
| 4,502,694 | 3/1985 | Uhrner . | |
| 4,591,167 | 5/1986 | Vossieck et al. . | |
| 4,648,605 | 3/1987 | Marsi . | |
| 4,728,448 | 3/1988 | Sliney | 252/12.2 |
| 4,836,560 | 6/1989 | Haberberger . | |
| 4,872,517 | 10/1989 | Shaw et al. . | |
| 5,188,377 | 2/1993 | Drumm . | |

Primary Examiner—Daniel G. DePumpo
Attorney, Agent, or Firm—Kent N. Stone; Susan Reinecke

[57] ABSTRACT

A radial face seal arrangement is disclosed comprising a stationary seal ring that is spring loaded against a seal seat affixed to a rotating shaft. The radial face seal arrangement further comprises an arrangement that not only allows for preloading of the stationary seal ring relative to the seal seat, but also provides for dampening yielding a dynamic sealing response for the radial face seal arrangement. The overall seal system, especially regarding the selection of the material for the stationary seal ring, is designed to operate over a wide temperature range from below ambient up to 900° C.

24 Claims, 2 Drawing Sheets

DYNAMIC FACE SEAL ARRANGEMENT

ORIGIN OF THE INVENTION

The invention described herein was made by an employee of the U.S. Government and may be manufactured and used by or for the Government for governmental purposes without the payment of any royalties thereon or therefor.

TECHNICAL FIELD

This invention relates to face seals and arrangements thereof for providing a fluid seal around a rotating shaft operating in inert, oxidizing, or reducing environments, such as argon, air, and hydrogen. The invention is particularly directed to a radial face seal arrangement located between high pressure and low pressure regions for sealing thereof over a wide range of temperatures. The invention is specifically concerned with such face seal arrangements that operate between about 25° C. to about 900° C. and seal a region where the rotating shaft passes through a housing.

Face-type fluid seals generally comprise a non-rotating, stationary or stator seal and a rotor ring serving as a seal seat and having means so as to rotate with a shaft. The seal seat has a face opposing that of the stator seal. The opposing faces extend radially outward from the periphery of the shaft and provide a seal typically between low pressure and high pressure regions each containing a fluid. Radial face seals and arrangements thereof operate with extremely small gaps between the stator seal and the opposing face of the rotating seal seat.

Prior art radial face seals and arrangements thereof have removable carbon face seals which are utilized for inert or reducing gas sealing applications. When operated in an oxidative environment to prevent carbon degradation, the seals are commonly removed and sealing is provided by clearance or labyrinth type seals. It is desired that face seals and their related arrangements be provided without the need to remove the seal to compensate for a changing environment.

Other types of face seals and arrangements thereof, such as non-contact labyrinth seals, are known in the art; however, such seals generally exhibit high leakage rates and have inadequate tolerances for thermal gradients and thermal expansions which commonly accompany high temperature applications thereof. It is desired that face seals and arrangements be provided that withstand high temperatures while having low, or even no leakage.

Hermetic face seals and arrangements thereof utilized for ferrofluid applications are also known. However, these seals encounter problems caused by high temperature applications and by being exposed to high magnetic fluxes.

The disadvantages of prior art devices may be generally summarized as including limited temperature capability, inability to tolerate high thermal growth, i.e., expansion of related elements, inability to withstand wide ranges of atmospheres, e.g., inert, oxidizing or argon, the inability to operate in regions of high magnetic fluxes, the inability to compensate for wear and, finally, the inability to compensate for seal dynamics. It is desired that face seals and their related arrangements be provided that do not suffer from these prior art disadvantages and drawbacks.

It is, therefore, an object of the present invention to provide a sealing arrangement successfully operable over a wide temperature range from about 25° C. to about 900° C.

Another object of the invention is to provide for a sealing arrangement having a wide variety of applications covering gases, such as inert, oxidizing or argon.

Still another object of the invention is to provide a seal arrangement that automatically compensates for thermal growth and wear while also providing for damping so as to compensate for seal dynamics.

Still further, it is another object of the invention to provide a seal arrangement having manual control means that compensates for thermal growth and wear while providing for damping so as to adjust for seal dynamics.

BACKGROUND ART

U.S. Pat. No. 3,554,559 to Dahlheimer describes a face seal arrangement for use on a rotating shaft which utilizes a sealing bellows in combination with a spring biasing arrangement. The seal has a stationary component which includes an annular seal seat. A rotating portion includes a spring bias seal washer and a bellows which mates with the stationary seat.

U.S. Pat. No. 4,094,514 to Johnson is directed to a sealing mechanism for use on a rotating shaft. The sealing device is comprised of a ferrous metal alloy material that is selected to provide high strength, wear resistance, and corrosion resistance.

U.S. Pat. No. 4,103,904 to Tankus discloses an elastic bellows used in a seal to provide a positive drive or inherent bias applied against a sealing member.

U.S. Pat. No. 4,323,255 to Wiese discloses a rotating shaft seal which uses springs to urge a seal ring into a central ring.

U.S. Pat. No. 4,502,694 to Uhrner describes a rotating shaft seal which provides primary and secondary sealing by utilizing a spring bias seal to form a primary seal that is forced into engagement with a bellows acting as a secondary seal.

DISCLOSURE OF THE INVENTION

This invention comprises a stationary sealing ring, a seal seat, a spring bias mechanism, and a bellows arrangement. The stationary seal ring serves as a primary seal and is spring biased against the seal seat. The bias spring mechanism is provided with preload characteristics that are adjustable using a threaded collar. The bellows is preferably constructed of a superalloy and is used as a secondary seal to trap leakage from the primary seal formed by the stationary seal ring in cooperation with the seal seat. An important feature of the invention is the use of a self-lubricating material for the stationary seal ring.

BRIEF DESCRIPTION OF THE DRAWINGS

The foregoing, as well as the other objects, features, and advantages of this invention, will become more apparent from the following detailed description when taken in conjunction with the appended figures in which.

DETAILED DESCRIPTION OF THE PREFERRED EMBODIMENTS

Figure 1:
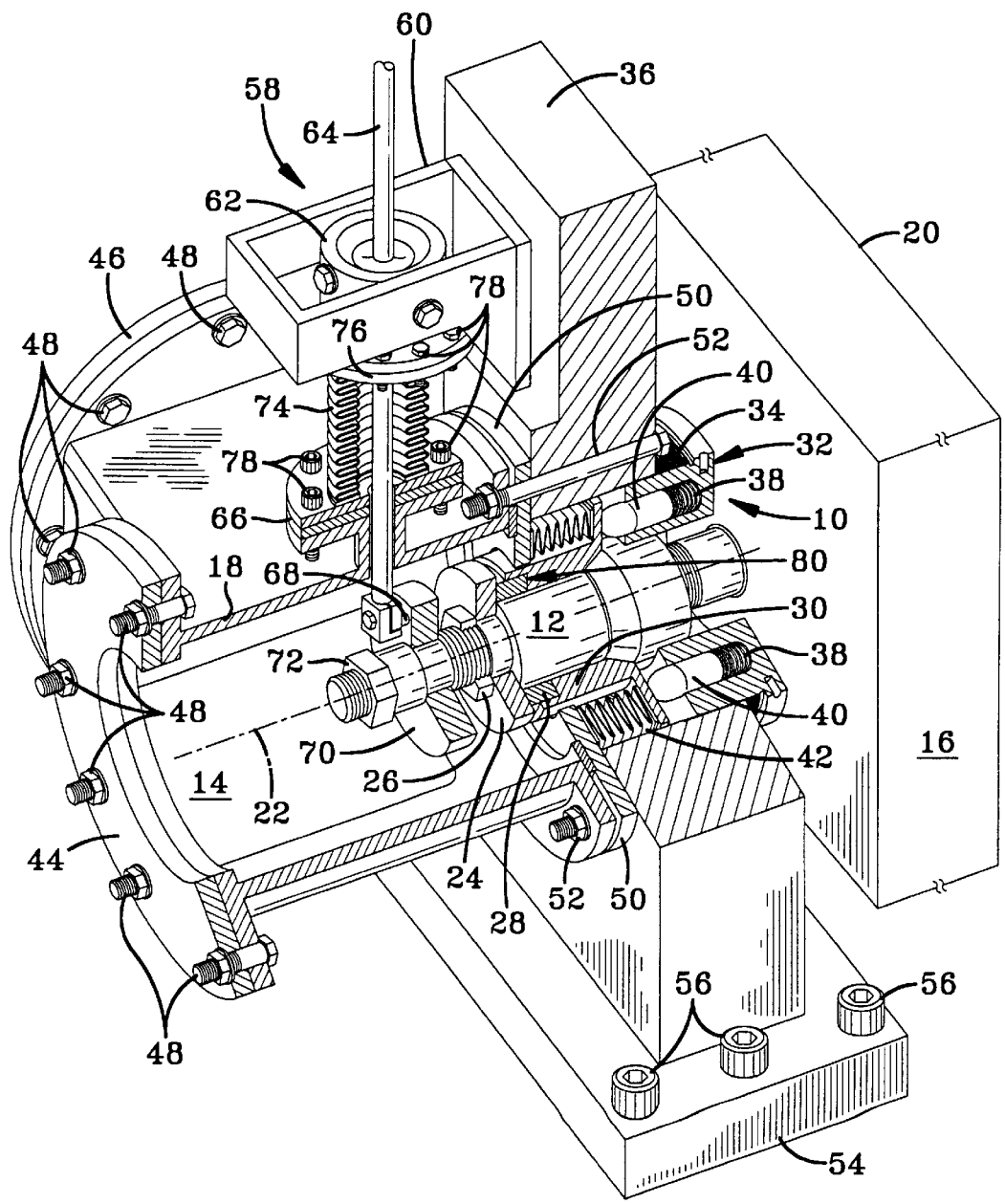
FIG. 1 illustrates an axial section view of a radial face seal arrangement constructed in accordance with the present invention.

With reference to the drawings, wherein the same reference numbers indicate the same elements throughout, there is shown in FIG. 1 a radial face seal arrangement 10 for sealing a region where a rotating shaft, such as 12, passes through a housing. More particularly, FIG. 1 is shown partially in section to illustrate the radial face seal arrangement 10 which is located between high pressure 14 and low pressure 16 regions respectively contained within chambers 18 and 20. The shaft 12 rotates about its axis 22 that passes through both chambers 18 and 20, each of which contains a fluid that provides an oxidizing, inert or reducing environment, e.g., air, argon or hydrogen, and that experiences a temperature spectrum of not less than 25° C. and not more than 900° C.

The radial face seal arrangement 10 comprises a seat seal 24 mounted, via a nut fastener 26, onto the shaft 12 for rotation therewith. The radial face seal arrangement 10 further comprises a stationary seal ring 28 preferably positioned at one end of a seal ring carrier 30 but may be merged with the carrier to form a one-piece device. The radial face seal arrangement 10 further comprises a collar 32 having threads 34 that mate with complementary threads of a support member 36. The collar 32 may be manually adjusted so that the devices that it carries, that is, springs 38 and mating push pins 40, may be moved inward and outward relative to the stationary seal ring 28. This manual adjustment allows for preloading of the stationary seal ring 28 with respect to the seat seal 24 in a manner as to be more fully described with reference to FIG. 2.

The preload adjusting collar 32 of FIG. 1 carries springs 38 that preferably cooperates with mating push pins 40 lodged in chambers that are preferably filled with a lubricating grease. A solid lubricant could be used in place of the lubricating grease to facilitate coulomb damping. There are preferably eight (8) springs 38, eight (8) mating push pins 40, and eight (8) greased chambers all in correspondence with each other, and all equally spaced apart from each other circumferentially about the preload adjusting collar 32. The radial face seal arrangement 10 preferably further comprises a bellow 42.

The high pressure chamber 18 has end cap members 44 and 46 that are separately clamped together by means of fasteners 48 as shown in FIG. 1. Further, the high pressure chamber 18 has end cap members 50 that are clamped together and attached to the support member 36, via fastener 52. The support member 36 is fixed to a plate member 54 via fasteners 56.

The embodiment of FIG. 1, illustrates an evaluation configuration 58 which does not form part of the present invention, but rather is included to further describe the possible techniques that may be used to evaluate the practice of the present invention. More particularly, the evaluation configuration 58 is provided for measuring the wear that is anticipated that the stationary seal ring 28 may be encountering. The evaluation configuration 58 has a housing 60 that is affixed to the support member 36 by appropriate means such as spot welding and includes a two (2) axis gimbal 62 which provides the proper orientation for a load/friction force rod 64. The load/friction force rod 64 passes through a circular bracing arrangement 66 and carries a wear-pin specimen 68 on one of its ends that is in contact with a wear-disk specimen 70 which, in turn, is connected to the shaft 12 by means of a threaded nut fastener 72.

The evaluation configuration 58 further comprises a shock absorbing member 74 that joins together the circular bracing arrangement 66 and a platform member 76 located at the bottom (as viewed in FIG. 1) of the housing 60, wherein all connections for the circular arrangement 66 and the platform 76 are provided by fasteners 78. As previously mentioned, the evaluation configuration 58 is not considered part of the present invention and, thus, is not to be further described herein. However, the face seal arrangement 10 is of importance to the present invention and includes the primary elements 24, 28, 30, 32, 38 and 40.

The seal seat 24 is preferably comprised of a high temperature alloy, sometimes referred to as a superalloy, that may be a nickel-based superalloy, commercially known as Inconel.

The stationary seal ring 28 is comprised of a self-lubricating, friction and wear reducing material comprising about 60–80 by weight metal-bonded chromium carbide, 10–20 by weight soft noble metal, and 10–20 by weight metal fluoride mixture. More particularly, the stationary seal ring 28 preferably comprises a material of about 70 percent by weight metal-bonded chromium carbide, about 15 percent by weight silver, and about 15 percent by weight metal fluoride. The material comprising the stationary seal ring 28 may be that described in U.S. Pat. No. 4,728,448 ('448) of H. E. Sliney, which is herein incorporated by reference. As more fully described in the '448 patent, the composite material forming the stationary seal ring 28 is a self-lubricating and very wear-resistant for use over a wide temperature spectrum from cryogenic temperatures of about 25° C. to about 900° C. in a chemically reactive environment. The stationary seal ring 28 has a face and rear portion, with the face thereof positioned in the direction of the high pressure chamber 14 so as to come into contact with the rear portion of the seat seal 24. The stationary seal ring has its rear portion in the direction of the low pressure chamber 16. If desired, the directions of orientation of the face and rear portions of the stationary seal ring 28 may be reversed.

The seal ring carrier 30 is preferably of a high temperature alloy such as Inconel and has one of its ends shaped so as to extend over the rear portion of stationary seal ring 28 in a manner as generally indicated by reference number 80 shown in FIG. 1. The seal ring carrier 30 has an extending portion on its other end that comes into contact with both the mating push pins 40 and the bellows 42. The seal ring carrier 30 is connected by appropriate means, such as by spot welding, to the bellows 42.

The springs 38 have one of their ends fixed in position against the adjustable collar as shown in FIG. 1, whereas the other end of each of the springs 38 provides an urging force preferably against the corresponding mating push pins 40 which, in turn, urge against the seal ring carrier 30. The springs 38 are preferably coil springs and formed of a superalloy material, such as that of Inconel. If desired, although not preferred, the springs 38 may be selected to directly contact the seal ring carrier 30 so as to eliminate the need of the mating push pins 40 which are also preferably of a superalloy material, such as Inconel.

The bellows 42 is connected, by appropriate means such as spot welding, between the end cap 50 and the seal ring carrier 30. The bellows 42 is preferably comprised of a superalloy material, such as Inconel, and operates in a known manner, such as that more fully described in the previously mentioned U.S. Pat. Nos. 3,554,559 and 4,502,694, both of which are herein incorporated by reference. As will be further described, the bellows 42 is axially arranged along the seal ring carrier 30 so that one of its ends is connected and located in proximity with the rear portion of the stationary seal ring 28 and its other end is connected so that the bellows 42 encloses a defined region and confines any fluid within the boundaries of that defined region.

In general, the radial face seal arrangement 10 provides a dynamic seal and keeps fluid on the face of stationary seal ring 28, that is, the side of the stationary seal ring 28 facing the high pressure chamber 14, from penetrating the housing or chamber at the region where the rotating shaft 12 passes through the housing, that is, the low pressure chamber 16. The stationary seal ring 28 is spring loaded against the seal seat 24 which is affixed to rotating shaft 12. The extent of the spring 38 preloading is adjustable using the threaded collar 32 as is to be more fully described with reference to FIG. 2. The bellows 42 prevents secondary leakage, that is, fluid leakage at the rear portion of the stationary seal ring 28. The preload springs 38 act upon the mating push pins 40 sliding in grease so as to provide dynamic seal dampening response. The operation of the radial face seal arrangement 10 may be further described with reference to FIG. 2.

Figure 2:
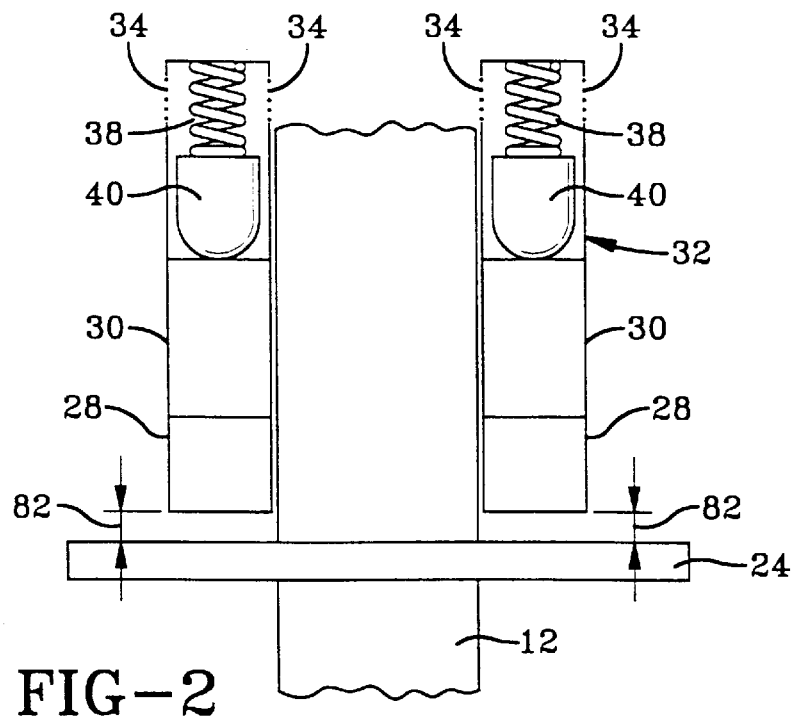
FIG. 2 is a schematic that illustrates the interrelationship of the primary elements of the radial face seal arrangement of FIG. 1.

FIG. 2 is a schematic illustrating the interrelationship between the primary elements 24, 28, 30, 32, and 38, and preferably element 40, of the radial face seal arrangement 10. As seen in FIG. 2, the adjustable collar 32 carries the springs 38 and the mating push pins 40. The collar 32, by means of its threads 34, may be moved so as to adjust a gap 82 located between the seal seat 24 that rotates with the axial shaft member 12 and the stationary seal ring 28. The adjustable collar 32, in cooperation with the springs 38 and the mating pins 40 as well as with the preferred seal ring carrier 30, provides means for urging the stationary seal ring 28 into engagement with the metal seal seat 24. The adjustment of the collar 32 is commonly referred to as a preloading condition in which the threaded collar 32 is used for changing the position of the springs 38 and preferably push pins 40 relative to the stationary seal ring 28 which, in turn, changes the preloading of the stationary seal ring 28 with respect to the seal seat 24, that is, the adjustment establishes the gap 82.

In operation, the adjustable collar 32 is positioned to establish a preload condition, wherein the mating push pins 40 apply urging force against the seal ring carrier 30 which, in turn, provides an urging force against the stationary seal ring 28 so as to adjust the gap 82 to any desired distance. The dynamic response of the arrangement shown in FIG. 2, is provided by the mating push pins 40 moving in their lubricating grease filled chamber so that any sudden movement of the stationary seal ring 28 relative to the seal seat 24 is absorbed or dampened by the mating push pins 40 sliding in the lubricating grease within their respective chambers.

As previously described, the composition of the stationary seal ring 28 allows the stationary seal ring 28 to successfully operate in a temperature spectrum from about 25° to 900° C. and this capability, in combination with the adjustable collar 32, springs 38 and preferably the mating pins 40, allows the radial face seal arrangement 10 to also operate successfully in the temperature spectrum of at least from 25° C. to 900° C.

It should now be appreciated that the practice of the present invention provides for a radial face seal arrangement 10 having the stationary seal ring 28 that allows it to operate in various fluid environments and provides the capability of successfully withstanding temperatures from 25° C. to about 900° C. The radial face seal arrangement 10 having its components illustrated in FIG. 2 provides for a primary seal. The radial face seal arrangement 10 also has a secondary sealing arrangement that may be further described with reference to FIG. 3.

Figure 3:
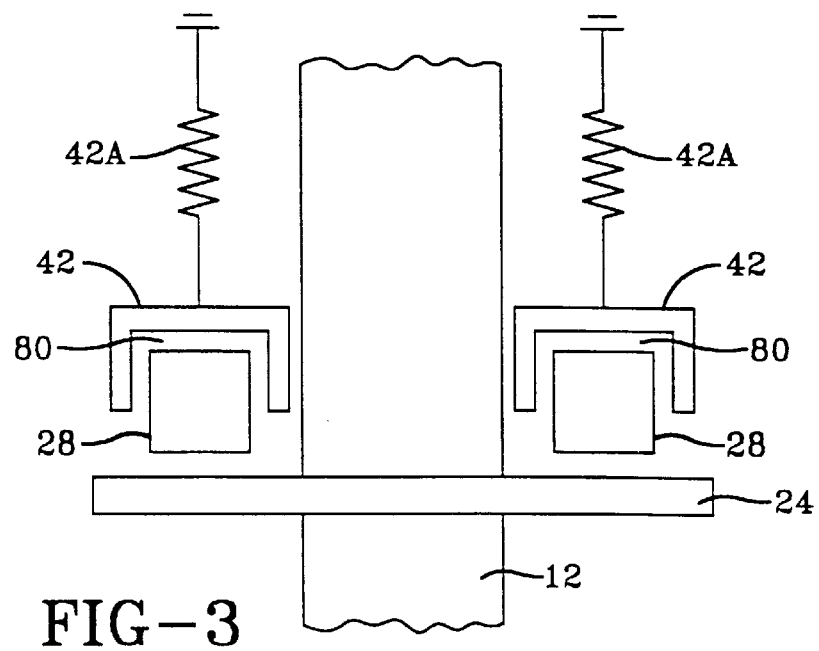
FIG. 3 is a schematic that illustrates the interrelationship of the primary (stationary seal ring-seal seat) and secondary (bellows) seals of the radial face seal arrangement of FIG. 1.

FIG. 3 is a schematic illustrating the interrelationship between the bellows 42 and the stationary seal ring 28. The bellows 42 has an inherent bias and is arranged to surround the general region 80 (see FIG. 1) of the stationary seal ring 28. The bellows 42 because of its accordion-like construction, its material and its spot welded connections at each end provides a flex characteristic to expand and compensate for high temperatures that may be experienced by bellows 42, while at the same time confine the fluid that may pass by the rear portion of the stationary seal ring 28. The flex characteristic is generally indicated with reference nomenclature 42A.

In operation, the bellows 42, having the characteristic 42A, serves as the means for inhibiting any fluid leakage outward from the primary seal formed by the stationary seal ring in contact with the rotating seat seal 24. The inhibition is referred to as a secondary seal and captures and confines the fluid passing by the rear portion of the stationary seal ring 28.

It should now be appreciated that the practice of the present invention provides for both primary and secondary sealing arrangements that operate in various fluids both of high and low pressures along with temperatures that may range from 25° C. to about 900° C.

While the invention has been described with reference to certain preferred embodiments thereof, those skilled in the art will appreciate the various modifications, changes, omissions and substitutions that may be made without departing from the spirit of the invention. It is intended, therefore, that the invention be limited only by the scope of the appended claims.

What I claim is:

1. In a radial face seal arrangement between high pressure and low pressure regions of fluid located along a rotating axial member having a metal seal seat mounted on said axial member for rotation therewith, the improvement comprising:

a stationary seal ring for sealably engaging said metal seal seat, said stationary seal ring having a face for engaging said seal seat and a rear portion and comprising a self-lubricating, friction and wear reducing material comprising about 60–80 percent by weight metal-bonded chromium carbide, 10–20 percent by weight soft noble metal, and 10–20 percent by weight metal fluoride mixture, means for urging said stationary seal ring into engagement with said metal seal seat, means for inhibiting a secondary leakage at said rear portion of said stationary seal ring, and means for damping axial motion between said stationary seal ring and against said seal seat.

2. The radial face seal arrangement according to claim 1, wherein said stationary seal comprises a material comprising about 70 percent by weight metal-bonded chromium carbide, about 15 percent by weight silver, and about 15 percent by weight metal fluoride mixture.

3. The radial face seal arrangement according to claim 1, wherein said means for urging includes:

a spring for urging the stationary seal ring toward the seal seat thereby preloading the engagement of said stationary seal ring with said seal seat, and an adjustable threaded collar for changing the position of said spring relative to said stationary seal ring which, in turn, changes the preloading of said stationary seal ring with respect to said seal seat.

4. The radial face seal arrangement according to claim 3 further comprising a mating push pin interposed between said spring and said stationary seal ring.

5. The radial face seal arrangement according to claim 4, wherein a plurality of springs operates in conjunction with a corresponding plurality of mating push pins.

6. The radial face seal arrangement according to claim 5, wherein said springs and said mating push pins are each comprised of a superalloy.

7. The radial face seal arrangement according to claim 6, wherein said plurality of mating push pins are housed in a corresponding plurality of chambers.

8. The radial face seal arrangement according to claim 7, wherein said chambers are each filled with a lubricating grease.

9. The radial face seal arrangement according to claim 1, wherein said means for inhibiting comprises a bellows having one end connected and located in proximity with said rear portion of said stationary seal ring and its other end connected so that said bellows encloses a defined region.

10. The radial face seal arrangement according to claim 9, wherein said bellows is comprised of a superalloy.

11. A radial face seal arrangement for sealing a region where a rotating shaft passes through a housing, said sealing arrangement comprising:
   (a) a seal seat mounted on said shaft for rotation therewith;
   (b) a stationary seal ring for sealably engaging said seal seat, said stationary seal ring having a face for engaging said seal seat and a rear portion and comprising a material of about 60–80 percent by weight metal-bonded chromium carbide, 10–20 percent by weight soft noble metal, and 10–20 percent by weight metal fluoride mixture;
   (c) means for urging said stationary seal ring into engagement with said metal seal seat; and
   (d) means for damping axial motion of said stationary seal ring relative to said seal seat.

12. The radial seal arrangement according to claim 11 further comprising means for inhibiting a secondary leakage at said rear portion of said stationary seal ring.

13. The radial face seal arrangement according to claim 12, wherein said stationary seal ring is carried by a seal ring carrier.

14. The radial face seal arrangement according to claim 11, wherein said stationary seal comprises a material comprising about 70 percent by weight metal-bonded chromium carbide, about 15 percent by weight silver, and about 15 percent by weight metal fluoride mixture.

15. The radial face seal arrangement according to claim 13, wherein said means for urging includes:
   a spring for urging the seal ring carrier that carries said stationary seal ring toward said seal seat; and
   an adjustable threaded collar for changing the position of said spring relative to said stationary seal ring.

16. The radial face seal arrangement according to claim 15 further comprising a mating push pin interposed between said spring and said stationary seal ring.

17. The radial face seal arrangement according to claim 16, wherein a plurality of springs operates in conjunction with a corresponding plurality of mating push pins.

18. The radial face seal arrangement according to claim 17, wherein said springs and said mating push pins are each comprised of a superalloy.

19. The radial face seal arrangement according to claim 18, wherein said plurality of mating push pins are housed in a corresponding plurality of chambers.

20. The radial face seal arrangement according to claim 19, wherein said chambers are each filled with a lubricant.

21. The radial face seal arrangement according to claim 20, wherein said lubricant is in the form of a grease.

22. The radial face seal arrangement according to claim 20, wherein said lubricant is a solid.

23. The radial face seal arrangement according to claim 13, wherein said means for inhibiting comprises a bellows having one end connected and located in proximity with said rear portion of said stationary seal ring and its other end connected to said seal ring carrier.

24. The radial face seal arrangement according to claim 23, wherein said bellows is comprised of a superalloy.

* * * * *